(12) United States Patent
Sahut D'Izarn et al.

(10) Patent No.: US 11,803,450 B2
(45) Date of Patent: Oct. 31, 2023

(54) CREATING A TREE OF DATABASE STATES

(71) Applicant: DASSAULT SYSTEMES, Vélizy-Villacoublay (FR)

(72) Inventors: Jean-Philippe Sahut D'Izarn, Vélizy-Villacoublay (FR); Eric Vallet Glenisson, Vélizy-Villacoublay (FR); Frédéric Labbate, Vélizy-Villacoublay (FR); Alban Roullier, Vélizy-Villacoublay (FR)

(73) Assignee: DASSAULT SYSTEMES, Vélizy-Villacoublay (FR)

( * ) Notice: Subject to any disclaimer, the term of this patent is extended or adjusted under 35 U.S.C. 154(b) by 0 days.

(21) Appl. No.: 17/557,159

(22) Filed: Dec. 21, 2021

(65) Prior Publication Data
US 2022/0197759 A1  Jun. 23, 2022

(30) Foreign Application Priority Data
Dec. 21, 2020  (EP) .................................... 20306644

(51) Int. Cl.
*G06F 11/14* (2006.01)
*G06F 16/21* (2019.01)

(52) U.S. Cl.
CPC ........ *G06F 11/1469* (2013.01); *G06F 16/219* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 8,099,572 B1* | 1/2012 | Arora | G06F 13/28 711/E12.013 |
| 9,684,686 B1 | 6/2017 | Morley et al. | |
| 2013/0311422 A1* | 11/2013 | Walker | G06F 16/217 707/609 |
| 2014/0040199 A1 | 2/2014 | Golab et al. | |
| 2014/0258777 A1 | 9/2014 | Cheriton | |
| 2016/0196289 A1* | 7/2016 | Lafreniere | G06F 16/219 707/695 |
| 2018/0307570 A1 | 10/2018 | Thomsen | |
| 2018/0307718 A1 | 10/2018 | Thomsen et al. | |
| 2018/0322050 A1 | 11/2018 | Thomsen | |

(Continued)

FOREIGN PATENT DOCUMENTS

| | | |
|---|---|---|
| WO | 2013/144720 A2 | 10/2013 |
| WO | 2013/144720 A3 | 10/2013 |

OTHER PUBLICATIONS

Extended European Search Report dated May 31, 2021, in Patent Application No. 20306644.4.

(Continued)

*Primary Examiner* — Eddy Cheung
(74) *Attorney, Agent, or Firm* — Oblon, McClelland, Maier & Neustadt, L.L.P.

(57) ABSTRACT

A computer implemented method for creating a tree of database states including accessing a database having at least one branch of database states, receiving at the database one or more write events that are applied to an identified state of the database, recovering the identified database state from the database, creating a new branch by creating a new patch as alternative state to the identified database state with a reference to the identified state.

18 Claims, 5 Drawing Sheets

(56) References Cited

U.S. PATENT DOCUMENTS

2022/0075770 A1    3/2022  Beier
2022/0091943 A1*   3/2022  Rao .................... G06F 16/2358

OTHER PUBLICATIONS

Extended European Search Report dated Jun. 2, 2021, in Patent Application No. 20306643.6.
Neumann, et al. ; Fast Serializable Multi-Version Concurrency Control for Main-Memory Database Systems ; Proceedings of the 2015 ACM SIGMOD International Conference on Management of Data ; 2015 ; pp. 677-689 13 Pages.
Gray, et al. ; The Recovery Manager of the System R Database Manager; ACM Computing Surveys (CSUR), 1981 ; vol. 13, No. 2 ; pp. 223-242 ; 20 Pages.
Chu ; MDB: A Memory-Mapped Database and Backend for OpenLDAP ; Proceedings of the $3^{rd}$ International Cofnerence on LDAP; 2011 ;12 Pages.
Bhardwaj, et al. ; DataHub: Collaborative Data Science & Dataset Version Management at Scale ; Sep. 2, 2014 ; 7 pages.
Huang, et al. ; ORPHEUSDB: Bolt-on Versioning for Relational Databases ; Mar. 7, 2017 ; 20 Pages.

* cited by examiner

CREATING A TREE OF DATABASE STATES

CROSS-REFERENCE TO RELATED APPLICATIONS

This application claims priority under 35 U.S.C. § 119 or 365 to European Application No. 20306644.4, filed Dec. 21, 2020. The entire contents of the above application are incorporated herein by reference.

FIELD

The disclosure relates to the field of computer programs and systems, and more specifically to a method, system and program for creating a tree of database states to provide the capability to create, query and compare alternative states of the database.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systènnes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

These applications are examples of "creative authoring applications" that provide the users with the capability of working in isolation from each other, exploring different solutions, and using an incremental method to solve problems by accessing different states of their work and navigating the history of modifications in a "time travel" way. By "time travel" we mean accessing past states of the database efficiently (that is to say, with a controlled elapse time deemed constant for all states) and be able to run read-only queries on these states. Storing the history of modifications and accessing past states of the database in a time travel way can also be important in certification processes such as the one existing in aeronautics to audit and understand in their context modifications made in the past.

Such creative authoring applications comprise long transactions in contrast to short transactions. Long transaction that are also referred to as long-running transactions are computer database transactions that avoid locks on non-local resources, use compensation to handle failures, and typically use a coordinator to complete or abort the transaction. The compensation restores the original state, or an equivalent. Hence, and in particular when the database is concurrently accessed by multiple users, transactions are required to respect the so-called ACID properties, namely, atomicity, consistency, isolation and durability, to guarantee the accuracy and integrity of the data stored in the database even in the event of errors, power failures, etc. In the context of databases, a sequence of database operations that satisfies the ACID properties (and these can be perceived as a single logical operation on the data) is called a transaction. For example, a transfer of funds from one bank account to another, even involving multiple changes such as debiting one account and crediting another, is a single transaction.

Among ACID properties, the consistency should be defined in relation to application-defined semantics and cannot be discussed for a generic database.

In particular, for creative authoring applications, it is desirable to provide the possibility to open transactions on any state of any branch of a database in order to provide the capability to create, query and compare alternative states of the database and thus comply with the workflow of creative authoring applications. notion of version control for datasets. The concept of the version control for the database concept is similar to software development version control development, but rather than tracking software code, the states of a dataset is tracked. Different strategies exist in known database systems for providing one or more of the abovementioned capabilities for a database.

Bhardwaj et al., DataHub: Collaborative Data Science & Dataset Version Management at Scale, In 7th Biennial Conference on Innovative Data Systems Research, 2015, provides users with the ability to perform collaborative data analysis building on this version control system. Two main data representations are used to achieve this goal: version-first representation and record-first representation. In the version-based representation, the data corresponding to a specific branch is stored in a dedicated location (namely, a SQL table) while in the record-first representation the data is stored as a list of records, each annotated with the versions it belongs to.

The common drawback on these two representations is that the notion of alternative or "version" is located at the data level. This requires that each data structure in the database to be aware of this notion and comes with a cost in software development and maintenance. In addition, answering a query requires to re-build the data structures for a given alternative state (or reusing a materialized one), with the corresponding cost in resources. The drawback of required resources is aggravated when these tools are applied to big data and/or in creative authoring applications to navigate the history of modifications in a time travel way.

Within this context, there is still a need for an improved method to create, query and compare alternative states of the database that combines time-travel properties and long transaction capabilities of authoring systems, while reducing computing resources and memory generated by I/O. More generally, there is still a need for an improved method for creating a tree of database states.

SUMMARY

It is therefore provided a computer-implemented method for creating a tree of database states comprising providing a database having at least one branch of database states, receiving by the database one or more write events that are applied to an identified state of the database, recovering the identified database state from the database, and creating a new branch by creating a new patch as alternative state to the identified database state with a reference to the identified state.

The computer-implemented method for creating a tree of database states may comprise one or more of the following:
  recovering the identified database state comprises:
    retrieving (S210), in a sequence of database states from a database storage, a patch on a branch of the identified state;
    retrieving (S220) a list of logged write events that occurred between the retrieved patch and the identified state; and
    applying (S230) the list of logged write events to the retrieved patch;
  creating a new branch by creating a new patch further comprises flushing the buffer to the database storage if the database state of the respective alternative state is not a patch stored in the database storage;
  the reference to the identified state comprises:
    a reference to the retrieved patch if the identified state is represented by a patch; and
    a reference to the patch created after the buffered pages being flushed to the database storage if the identified state is not represented by a patch;
  the new patch comprises a list of the new pages that are modified or created by new write event(s), therefore obtaining a sequence of states wherein some states have respectively a corresponding patch;
  the new patch further comprises a mapping table comprising a mapping between the physical addresses of the buffered pages and logical addresses of the pages at a data structure layer of the database;
  each logged write event has a mapping table by duplicating an existing mapping table and applying local mappings up to the desired logged write event;
  the new patch further comprises:
  a descriptor comprising at least one of:
    the number of physical pages modified or created by the new write event(s);
    metadata for checking integrity of the descriptor;
    a timestamp of the new write event(s);
    a reference to the corresponding identified state of the database;
  the database storage is append-only;
  the method further comprises, before retrieving a list of logged write events logging each of the one or more write events on a log storage received by the database and writing the history of modifications as the log of event(s) to a log storage for intermediate transactions which are transactions before flushing to the database storage; and/or
  the log storage is append-only.

It is further provided a computer program comprising instructions for performing the method.

It is further provided a database comprising computer readable storage medium having recorded thereon the computer program.

It is further provided computer readable storage having recorded thereon the computer program.

It is further provided a computerized-system comprising the database.

BRIEF DESCRIPTION OF THE DRAWINGS

Embodiments will now be described, by way of non-limiting example, and in reference to the accompanying drawings, where.

DETAILED DESCRIPTION

Figure 1:
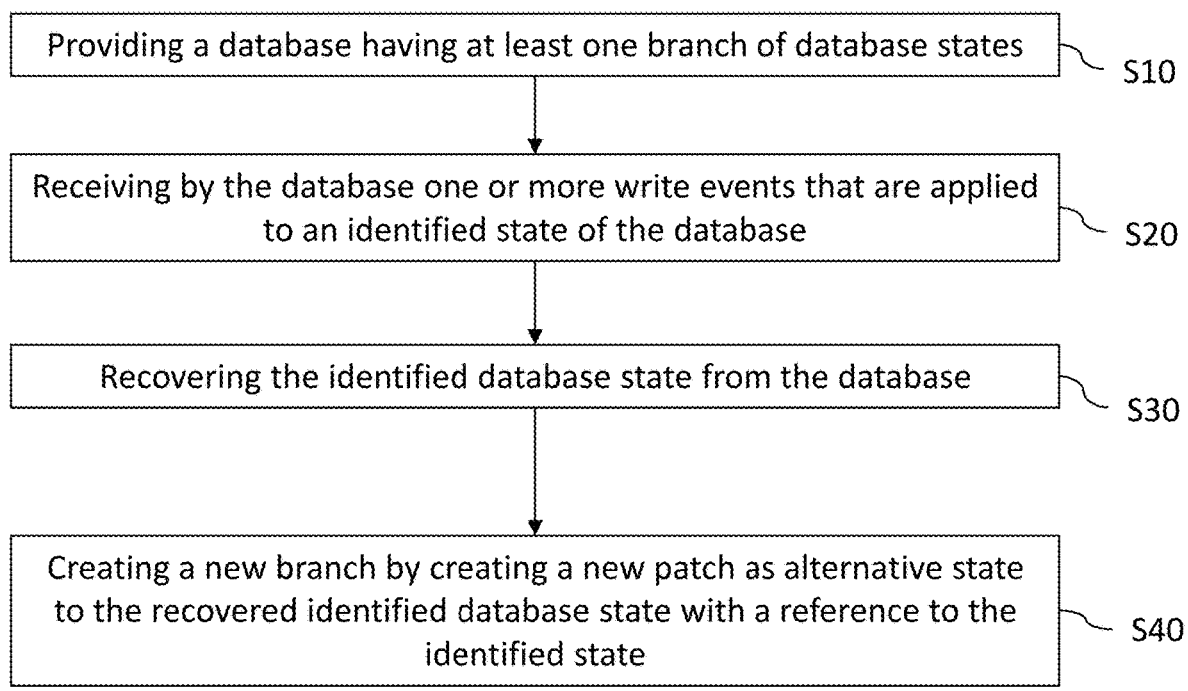
FIG. 1 shows a flowchart of an example of the method of creating a tree of database states.

With reference to the flowchart of FIG. 1, it is proposed a computer-implemented method of creating a tree of database states. The method comprises providing (S10) a database having at least one branch of database states.

By "database", it is meant any collection of data (i.e., information) organized for search and retrieval (e.g., a relational database, e.g., based on a predetermined structured language, e.g., SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Fields are also referred to as pages. Database pages are the internal basic structure to organize the data in the database files. A page is a basic unit of I/O operation. The size of page will depend on the implementation of the database; for instance, in SQL database server the size of a page is 8 kB.

Users may retrieve data in the database primarily through queries. Using keywords and sorting commands, users can rapidly search, rearrange, group, and select the field in many records to retrieve or create reports on particular aggregates of data according to the rules of the database management system being used.

A database state is a set of stored data at a given time. A database is always in one specific state. Adding, removing or modifying the information stored in a database changes its state. For example, a database may contain information about different designs of a CAD model characterized by some, for instance length and/or shape, parameters. The act of modification of any of these parameters, for example during the design process, and storing this new set of parameters in the database will change its state.

A database can be depicted as a conceptual model that comprises several abstraction layers or levels, each abstraction layer providing a conceptual model or algorithm that may be away from any specific implementation. In examples, the database may comprise a data structure layer and a storage layer. The storage layer (also referred to as physical level) is responsible for storing the data in persistent memory, e.g., on hard drives. The storage layer can use both volatile and persistent memories for storing the data. The data structure layer (also referred to as logical level) is responsible for describing how data is stored in the database by using a data structure. The data structure rules how the data are modeled and organized for a specific purpose, e.g., storing the data persistently; implementation of data types and operations allowed on data are the most database-specific at this level.

Each branch of a database can be seen as a sequence of the database states, wherein each database state in a branch is obtained by modifying another database of an earlier time and in the same branch. A fork is the act of creating a second branch from a first branch and represents the relation between the second branch and the first branch. Alternative states are database states which are accessed on different branches of a database.

The method further comprises receiving (S20) by the database one or more write events that are applied to an identified state of the database. A write event is a request by a system communicatively coupled with the database to write information in the database, e.g., the system is a computer running a CAD application. Writing information in the database encompasses adding new data in the database and/or removing (that is, deleting) information already stored in the database and/or modifying already stored data in the database. The database may allow multiple users working on the database to send their write request at the same time, or substantially at the same time. The database may queue multiple write requests and execute them sequentially. A write event is thus an operation that changes the state of the database after its execution by the database, the execution by the database being a commit of a transaction that comprises the write event.

The method further comprises recovering (S30) the identified database state from the database. Recovering the identified state from the database means retrieving, i.e., restoring the value of the identified state from the database storage. The identified state either is either directly retrievable from the database storage or restorable by combining the information from different items stored on the database storage. An example of the latter is restoring the database state from the log files stored as in the logging strategy, wherein changes are first recorded in a log file and be written on a non-volatile storage. A log file is a file that stores a chronological record of actions.

The method further comprises creating (S40) a new branch by creating a new patch as alternative state to the recovered identified database state with a reference to the identified state. Creating a patch means computing a patch. A patch comprises a list of the new pages that are modified or created by one or more new write events. In examples, a new patch (the last one computed) lists the differences between the new patch and a current patch, i.e., the last patch obtained before the new patch has been computed. A reference is a piece of encoded information identifying a state. The state may be the identified state of an alternative state.

The method can be used with different kind of databases, for example graph database systems as RDF InMemory service. The method improves the capability to create, query and compare different alternative states of the database. It can be understood as Git-like capabilities on languages like SQL or SPARQL with time travel capabilities. The branching capability according to this method is applied at the storage layer level using all the software stack, while historically it is rather in the data structure layer. Therefore, all data structures, either existing or new, can have this branching capability without being aware of it, even if there exists no "version-able" variant of this data structure. Being a version-able data structure means that the data structure is persistent, i.e., it preserves the previous version of itself when it is modified. This capability is provided with a cheap CPU and memory cost and with a low cost of software development and maintenance. The present method provides branching capabilities to create, query and compare alternative states of the database without any impact on these data structures as the queries and algorithms run the same way on all branches, without any notion of the branch they are on. The storage cost is limited to new modifications on each branch and there is no duplication of data or pages. As a result, the CPU and memory cost for transaction creation is similar to the same cost without any branch capability.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

Figure 5:
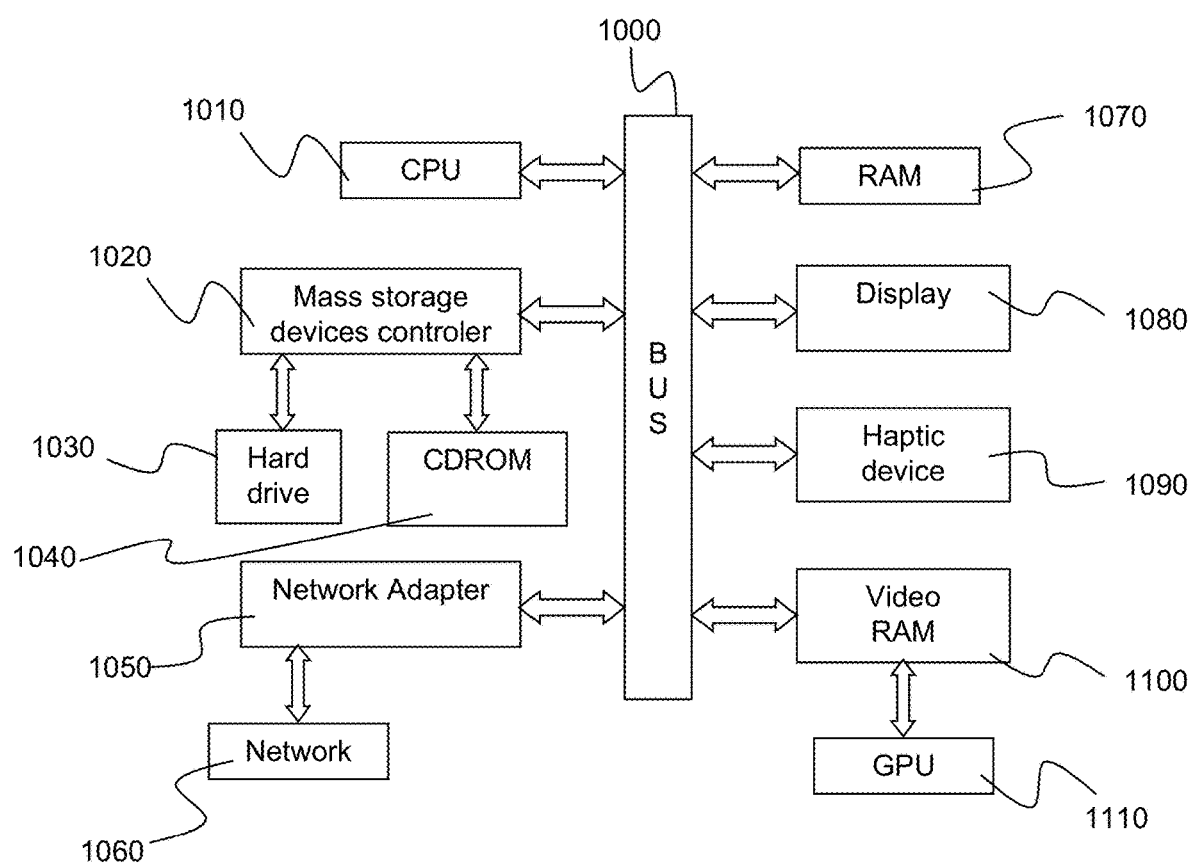
FIG. 5 shows an example of a system.

FIG. 5 shows an example of the system, wherein the system is a server, e.g., a server hosting a database.

The server of the example comprises a central processing unit (CPU) 1010 connected to an internal communication BUS 1000, a random-access memory (RAM) 1070 also connected to the BUS. The server may be further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). One or more mass memory devices may be used for implementing the storage layer of a database. A network adapter 1050 manages accesses to a network 1060. The server may also include a haptic device 1090 such as cursor control device, a keyboard or the like. A cursor control device is used in the server to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the server system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

A typical example of computer-implementation of a method is to perform the method with a system adapted for this purpose, e.g., a server. The system may comprise a processor coupled to a memory; the memory having recorded thereon a computer program comprising instructions for performing the method. The memory may also store a database. The memory is any hardware adapted for such storage, possibly comprising several physical distinct parts (e.g., one for the program, and possibly one for the database).

In an example, the method is employed in the process of general manipulation of modeled objects with an authoring application. A modeled object is any object defined by data stored, e.g., in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system For the sake of explanation only, the example of the method employed in CAD systems are now discussed.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g., non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g., representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e., increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g., mechanical) part or assembly of parts (or equivalently an assembly of parts, as the assembly of parts may be seen as a part itself from the point of view of the method, or the method may be applied independently to each part of the assembly), or more generally any rigid body assembly (e.g., a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electro-mechanical or electronic part (including e.g., consumer electronics, security and/or control and/or instrumentation products, computing and communication equipment, semiconductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging).

The designing process in CAD is typically a collaborative procedure and requires several people to work independently or interdependently to each other. In this matter, it is important for the database of the CAD system to provide the isolation and integrity of the database state for all users. Such design applications necessitate creative authoring which requires investigating different design possibilities by an incremental method and navigating through their history of modifications in a time travel way method and to create, query and compare alternative states of the database efficiently. Examples of the method of the present disclosure are discussed in the context of CAD authoring applications. It is to be understood that these examples are not limited to CAD authoring applications and can apply to any authoring application. More generally, these examples of the present method are not limited to the specific field of authoring application, that is, these examples of the method can apply to any database that stores a database state.

Referring back to FIG. 1, further explanations are provided. A database is provided at step S10 having at least one branch of database states. In examples, the database may have more than one branch of database states. For example, this database may include the collected information of a CAD model design via a creative application of an incremental method by a designer or several designers which may work on the CAD model in parallel. In examples, each branch may be attributed to a different group of tasks in a design process and may include the collected information of the CAD model design provided by a group of designers for the design process. The database may comprise a set of data pages as its smallest unit, as previously discussed; It is to be understood that any other internal basic structure to organize the data in the database may be used.

In examples, the database storage stores records into pages and is append-only. Therefore, the database is immutable; the entire history of all the transactions is stored in the event log storage. This is useful for making easier audit and historical queries.

Next, at step S20, one or more write events applied to an identified state of the database are received by the database. A write event is a request by a user to write information in the database to add one or more new data or modify the existing one or more data already stored on the database. Multiple write events may be sent by multiple users at the same time in multiple write transactions. Each write event comprises a sequence of information to update the database status. The write events may be sent via an Application Programming Interface (API), or through a Remote Procedure Call (RPC) usually using pipes, sockets, or shared memory. For instance, a group of designers working a same product concomitantly modify 3D parts of an assembly of parts forming a product and each modification (that is a write event is received) of a part performed by one or more designers generate the said sequence of information to be applied to update the database.

Next, at step S30, the identified database state is recovered from the database. The recovering of an identified state from the database means retrieving its value from the database. This identified state may be queried by a user or automatically by a computer. The recovering of the identified state may be dependent on the method to store the database states in the database storage. An example of storing database states in a database storage is now discussed.

In the example of storing database states in a database storage, write events received by the database are logged and each logged write event forms a new state on the database, that is, the commit of a write transaction including write events forms a new state of a database. Logging a write event is the operation of keeping a log in a non-volatile memory. It is to be understood that any type of non-volatile memory (also referred to as long-term persistent storage) may be used. A log file is a file that stores a chronological record of operations to be carried out by the database, e.g., upon request of system communicatively coupled with the database. Logging a write event thus means storing the write event received by the database at a time t in the log file after the former last write event received at a time t−1 in the sequence of write events received by the database. The log file thus comprises the set of write events received by the database. The log file comprises modifications (the write events) to be applied on the stored data in the process of a committing a write transaction, the write events being inside the write transaction. A write transaction is the unit of a read/write event of a database while keeping its integrity of the data. A transaction itself consists a sequence of information to update the database state. The actual information of a desired database state can be re-constructed from a known state and by applying the changes (that is the write events) recorded in the log. The write events modify the state of the database as seen by the write transaction.

Still in reference to this example of storing database states in a database storage, it further comprises buffering pages modified or created by the one or more write events. As already said, database pages are the internal basic structure to organize the data in the database files, and a page is a basic unit of I/O operation. A database page is a contiguous block of the database memory as the smallest unit of data for database management. The architecture of the database assigns every existing or new data structures to store their specific information inside pages. In examples, a page has a physical identification in the storage hardware (where it exists physically) and a logical identification used to have a fixed identifier of this page even though the page evolves over time and has different physical identifications. In examples, the storage layer is the allocator of a file system which serves as the data structure layer. Such a mapping between the logical pages and the physical pages isolates the data structures from the concurrency control model of the storage layer. A conceptual need is to have a consistent mapping of all the pages for a transaction running on a given identifier. In some examples, the identifier may be a timestamp. A timestamp is a sequence encoded information identifying when a certain event occurred. In other examples, the identifier may be a flag denoting the database states (e.g., "version 1.0"). Buffering is to temporarily store the data in a specific region of a physical memory which is called buffer. Hereinafter this buffer is called as shared altered state. These two terms might be used equivalently and interchangeably. The shared altered state is a state of altered pages shared between transactions. A shared alter state is thus born from a transaction and can live without the transaction; it can be merged with another shared alter state to create a new shared altered state which corresponds conceptually to the merge of the two transactions. Hence, a shared alter state may be linked to a transaction until the transaction is either successfully committed or aborted. In case of abortion of the transaction, the shared altered state may be discarded. If the first transaction is committed, the shared altered state may be available to second transactions, no longer linked to the first transaction: it is now considered as all the modified pages since the previous patch (meaning that its semantics has changed: it is no more "the pages modified by a given transaction" but "the modified pages since the previous patch").

The example further comprises creating a patch by flushing to a database storage the buffered pages if a threshold has been met. Creating a patch means computing a patch. A patch comprises a list of the new pages that are modified or created by one or more new write events. In examples, a new patch (the last one computed) lists the differences between the new patch and a current patch, i.e., the last patch obtained before the new patch has been computed. The act of flushing empties the shared altered state and writes its contents to some non-volatile memory. The threshold for this flushing can be, for example, the size of the log and/or a size of the buffered pages and/or a time of reconstruction from the log and/or a time that elapsed since the last flush was carried out. The time of reconstruction from the log is the estimated time for the re-application of the events logged in the event log storage to re-construct the identified state.

According to the example, each write event received by the database is logged. In examples, this is performed by maintaining one or more files (also referred to as log file(s)) that store the history of modifications to the stored data in the process of at least one write event. In other examples, logging may be performed using a shared log queue or a distributed file system. The log stores the history of all the modifications caused by one or more successive write events, even all the write events received by the database. Each logged write event creates a new state on the database, and the log file thus stores information that allow recovering the new state, or said otherwise, the log stores database transactions caused by the received write events. It is to be understood that states as commit of transactions are accessible with time travel. Modifications of not-yet-committed state are done through write operations creating log events in memory and new pages in memory. At commit, log events are written to disk and pages are either buffered or written to disk.

In examples, logging each write event comprises writing the history of modifications that are incurred by the received write event(s) as (under the form of) the log of event(s) to the event log storage on the memory and/or on temporary storage, for example on a temporary disk space or a temporary file, for intermediate transactions which are transactions before flushing to the database storage (e.g., on a disk). An intermediate transaction (also referred to as unflushed transaction) is a transaction caused by a received write event and stored on a log, but not yet associated with a durable state of the database. In this situation, the logging acts as a complete collection of all transaction caused by the received writes events, and the one or more transactions not yet flushed on the database storage of the database are stored as intermediate transactions.

In examples, the event log storage is append-only, i.e., the new logs are always appended to the file instead of replacing the existing data. Append-only log storage records data changes that occur by writing each change to the end of the file. In doing this, it is possible to recover the entire set of received write events by replaying the append-only log from the beginning to the end. In examples, one or more pas write events (flushed or not on the database storage) are performed again by replaying one or more transactions and/or one or more intermediate transactions stored on the append-only event log storage.

According to the example, pages modified or created by the received write event(s) are buffered. For example, these modified or created pages are those obtained as a result of the user interactions of the designers of the group on the product: their modifications on the product are being saved. Buffering means that the pages modified or created by the received write event(s) are stored in a memory so that the system will deal with these pages at a later stage. Hence, the modified versions of pages of write events are queued in a memory write buffer, and will be flushed at a later stage. Theses modified versions of pages are a set of pages that are called shared altered state. It is to be understood that database pages have been chosen for the purpose of illustration only, and that any other database basic unit of I/O operation might be used.

These pages modified or created by the received write event(s) stay in the buffer memory until a threshold has been met; consequently, when the threshold is met, the buffer memory is flushed (S50). Creations of patches triggered as a result of the buffer memory flush will be discussed hereinafter.

In examples, the threshold may be a size of the event log. Hence, when the size of the event log exceeds or is equal to the threshold, is the buffer memory flushed. The event log may be a log file as already discussed. The size of the event log may comprise the number of received write events stored thereon and/or the space (e.g., measured in Megabytes (MB), Gigabytes (GB)) taken up by the event log on a storage medium that stores the event log. For instance, the threshold may be set at 16 MB and the buffered pages are flushed when the size of the event log is equal or greater than 16 MB.

In examples, the threshold may be a size of the buffered pages. Hence, when the size of the buffered pages exceeds or is equal to the threshold, is the buffer memory flushed. The size of the buffered pages may comprise the number of pages stored on the buffer and/or the space (e.g., measured in Megabytes (MB), Gigabytes (GB), . . . ) taken up by the buffered pages on the buffer. For instance, the threshold may be set at 1 GB and the buffered pages are flushed when the size of the stored buffered pages is equal or greater than 1 GB.

In examples, the threshold may comprise a time that elapsed since the last flush was carried out. Hence, the memory flush is regularly carried out, e.g., each n seconds or n minutes or n hours or n days or n weeks n months and so on.

In examples, the threshold may comprise a time of reconstruction from the log. The time of reconstruction is an estimation of the time that would be required for replaying part or the whole of the events that are logged; the time of reconstruction is thus the time for recomputing a set of transactions that occurred or that are logged. In doing this, it is possible to recover the entire set of received write events by replaying the append-only log from the beginning to the end. In examples, one or more pas write events (flushed or not on the database storage) are performed again by replaying one or more transactions and/or one or more intermediate transactions stored on the append-only event log storage. The time of the reconstruction from the last flush may be estimated based on the number of log events in the event log storage since the last flush was carried out.

As previously discussed, the example further comprises creating a patch of the pages modified or created by the writes event(s) that are stored in the buffer once these pages have been flushed in the database storage. The created patch can be also referred to as new patch as the system managing the database may comprise at least one already existing patch previously obtained as the result of a flush of buffered pages. Each created patch may be identifiable by assigning an identifier (e.g., a timestamp or an ascending integer index) so that it is possible to order all the created patches in their order of creation, thus forming a sequence of patches. The flushed patches are therefore in a chronological order of being flushed by assigning them a respective identifier. The new patch is thus the latest patch created and stored at the end of the file. The new patch comprises a list of one or more pages that are modified or created by the last received write event. The new patch only lists the modifications of pages between the new patch and the penultimate patch obtained as a result of the penultimate flush of the buffered pages. This contributes the improvement of the memory usage and I/O cost.

Thus, the creating of a new patch is performed each time the threshold has been met consecutive to receiving by the database of one or more write event(s). For each repetition of the creating, a list of the new pages that are modified or created by the new write event(s) received by the database is created. A sequence of states is therefore obtained wherein some states have respectively a corresponding patch. Indeed, there is no guarantee that a patch represents a state at least because the creation of a patch depends on the flush to the database of the buffered pages that is triggered by reaching the threshold. Therefore, a patch can represent a state of the database, or a combination of one or more states of the database, and/or part of one or more states of the database. A state is recursively made of patches. The set of pages $P_i$ reconstructed from the set of pages $D_i$ of a patch $i$ is recursively reconstructed. This can be noted as follows:

$$P_0 = D_0$$

$$P_i = D_i \cup (P_{i-1} \setminus D_i)$$

For example, and using pseudo-notation, let the first patch be P1, the state of the database is made of P1 only and it is noted State(P1)=[P1]. For a second patch P2, it can be noted State(P2)=[P2]+State(P1). Similarly, a third patch P3 can be noted State(P3)=[P3]+State(P2)=[P1]+[P2]+[P3]. Thus, a patch (e.g., P2) is a part of the database state at state P3. A state of the database is made of an ordered sequence of patch, e.g., [P1]+[P2]+[P3], and in the sequence, [P1] and [P1]+[P2] also represent database states. But State(P3) will not see the pages of the patch P1 that were also modified in P2: it will see only the latest ones (i.e., the ones from P2).

The example thus may exploit a hybrid choice of storage method between on one hand, a mapping table of page versions coupled with a memory write buffer, and on the other hand, an event log storage.

Figure 4:
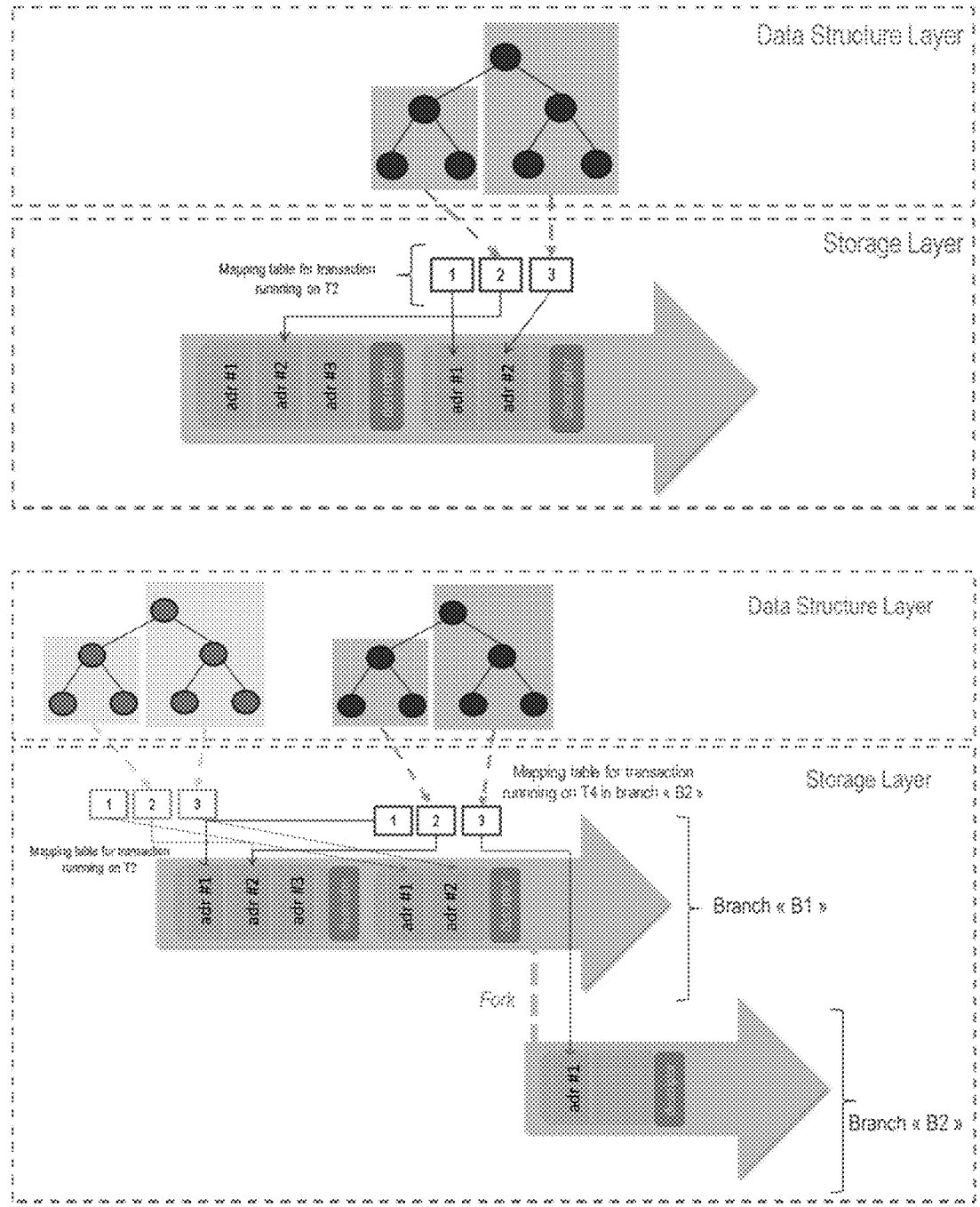
FIG. 4 shows an example of a creating a new branch.

A description of the conceptual model of a database has been previously discussed. In examples, the database comprises a storage layer, where one can allocate memory, modify it, and save the modifications. Steps S30-S50 may be realized by the storage level. The database further comprises a data structure layer, where data structures (such as B-Tree) are created by allocating memory in the storage layer and modify the memory areas to create the structures needed. Steps S10-S20 may be realized by the data structure level. FIG. 4 shows an example of the relations between the data structure layer and the storage layer. FIG. 4 is discussed hereinbelow.

Figure 3:
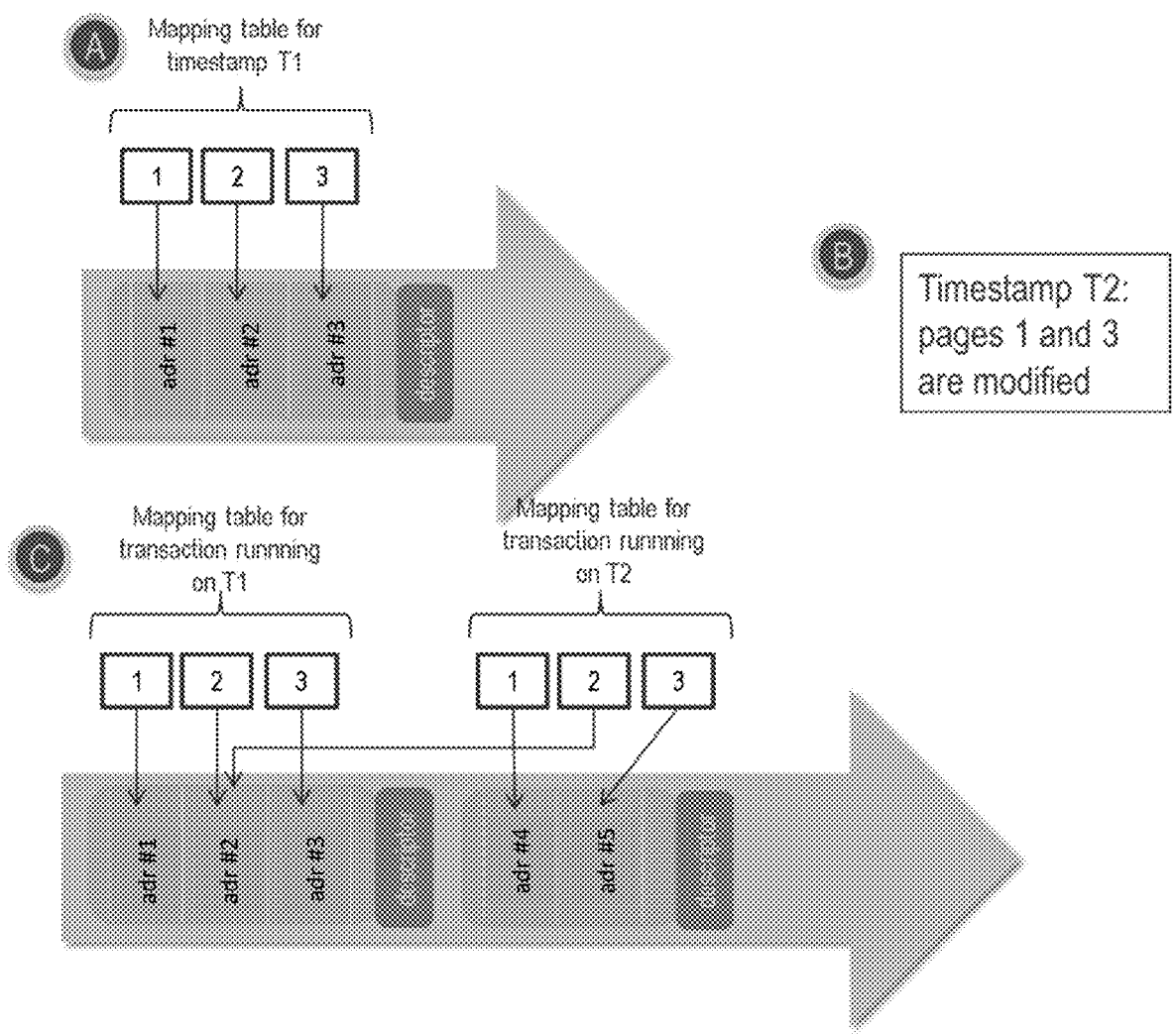
FIG. 3 shows a schematic of an example modifying data pages and recording modified data pages in an append only storage.

Referring now to FIG. 3, a schematic example of the creation of a new patch is now discussed. This example starts with three data pages stored on an append only data storage; these three pages have been already flushed on the database, and as in a traditional shadow paging architecture, when n pages are flushed to disk, a patch of n pages is created. Each of these pages has a physical identification of the data in the storage layer where they exist physically, e.g., each page has a physical address on a storage medium such as a disk drive. In the example, the database refers to the data pages by their logical identification which is not impacted by the evolution of the physical identification, e.g., each page has a logical address from the database point of view. These three pages are "referenced" in an already existing patch as they have been already flushed. To that aim, the patch may comprise a mapping table. The mapping table should be defined before to establish a mapping between the said logical and physical identifications. It is to be understood that any other technique other than using a mapping table might be used to access a file on disk. The patch created after the flush of the three pages comprises a mapping table. The mapping tables may be seen as a theoretical multi-version index. They execute the same function as theoretical multi-version indexes but without actually implementing a full multi-version index so as to improve the performance. As shown in FIG. 3, for the timestamp T1, the mapping table maps the logical addresses (1,2,3) to the physical addresses (adr #1, adr #2, adr #3) in the storage, respectively. For the timestamp T2, pages 1 and 3 are modified. The logical addresses are not changed and instead the new mapping table points to the old physical address for page 2 in T1 and new physical addresses of pages 2 and 3 in T2. When a transaction is created (or opened) on the database, this mapping table is built or instantiated in memory between the logical pages and the physical pages. Therefore, the data structure sees only its logical pages, without any knowledge of the physical pages and the data structure sees only its logical pages, without any knowledge of the physical pages. If a mapping table already exists in memory, the new mapping table is created by duplicating an existing mapping table, e.g., the mapping table of the previous timestamp and applying the local mappings up to the desired transaction and the database state. If there does not exist a mapping table, all the patches are scanned by jumping back from descriptor to descriptor, e.g., from descriptor of the patch timestamped T2 to the descriptor of the patch timestamped T1, and so on, to get the latest version of all pages that is being defined by the first descriptor chosen to use. This mapping table strategy will reduce the memory cost of single multi-version index and its high contention on locks. An implementation of the mapping table may be selected for obtaining a table with the fastest association between an integer and an integer/pointer. In examples, the mapping table may be performance-efficiently created based on a lockless compare-and-swap array, as known in the art. In other examples, the mapping table may be created based on userland read-copy-update (RCU) mechanism of synchronization.

In the example of FIG. 3, the patch comprises a list of one or more new pages that are modified or created by the new write event(s), and further comprise as well as a descriptor. A patch representing a set of pages, the patch may be subject to some alignment constraints in order to be able to take advantage of the mapped memory. For instance, 4 kbytes per pages are allocated in the virtual memory of Intel© and Arm© processors; as another example, the manager of virtual memory of Windows© imposes patches to be aligned by block of 64 kbytes; therefore a patch is a multiple of 64 kb blocks and the descriptor is written at the end of the last 64 kb block. The descriptor may be added as the last element to be written at the end of the memory block containing the pages of the patch to support atomicity: the presence of the descriptor indicates that the pages have been committed successfully otherwise, writing this descriptor at the very end provides an easy way to verify that the entire patch has been registered correctly-. Otherwise, all data found after the previous descriptor are ignored, i.e., discarded. In examples, a descriptor may comprise at least one of the following:

The number of physical pages modified or created by the new write event(s). Thus it is possible to find the beginning of the current patch and finding the previous patch and easier pre-allocation of the memory resources associated with the patch.

Metadata for checking integrity of the descriptor, thus ensuring that the descriptor is not corrupted.

A timestamp for the write event(s) represented by the patch. The sequential order of commitments of the patches (that is, their flush) can be retrieved from the descriptor. This improves the reconstruction of the database if necessary.

A reference to the corresponding identified state of the database. Using the reference, the database is able to find that the alternative state is referring to which branch.

The presence of the descriptor may provide a reliable stop condition for the algorithm of page mapping. Back to the example of FIG. 3, the patches comprise a list of one or more new pages that are modified or created by the last received write event(s) and a descriptor. The patches might further comprise a mapping table, the mapping table comprises the mapping between the said logical and physical identifications.

The actual information of a desired database state, in particular a state which does not correspond to a patch in the database storage, can be re-constructed from a known state, i.e., a state with a corresponding patch in the database storage, in combination to the application of the changes recorded in the event log files recorded in the event log storage.

Figure 2:
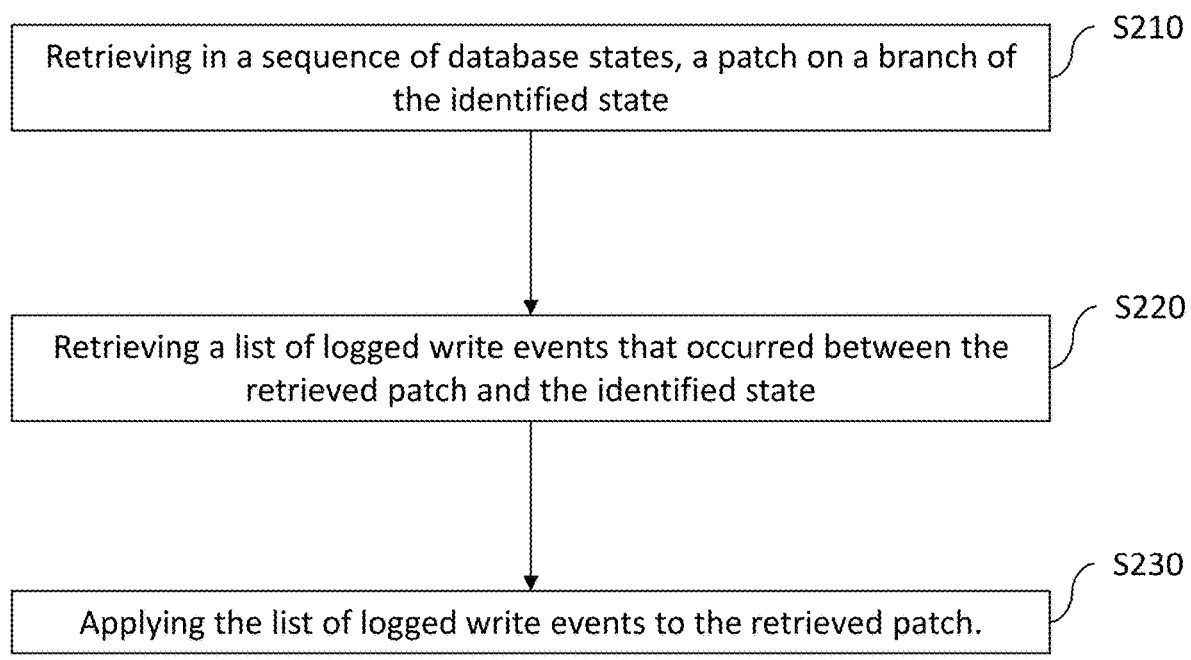
FIG. 2 shows a flowchart of an example of the method of recovering the identified database state from the database.

Now, recovering the identified database state from the database is discussed. FIG. 2 shows an example of the recovering of the identified database state from the database. This identified state is either a database state which already exists on the disk as a result of the flushing the buffer or could be a state chronologically between two stored patches. In either case, the method retrieves a patch on a branch of the identified state in the sequence of states from the database storage at step S210. As previously explained, the patch retrieved for building the database state involves the retrieval of preceding patches as a patch is generally not self-sufficient. In the former case, this retrieved patch is the corresponding patch of database state which has been flushed to the disk as the result of a write event. In the latter case, the method retrieves a list of logged write events that occurred between the retrieved patch and the identified state. The retrieved patch in step 210 is related to the same branch as of the identified state. In an example, the retrieved patch is a first patch before the identified state in the chronological order. In another example, the retrieved patch is the first patch after the identified state in the chronological order. In other example, the retrieved patch is the closest patch to the identified state in the chronological order, i.e., minimizes the length of the list of the logged write events occurred between the retrieved patch and the identified database state. Then, in step S220, the method retrieves the list of the logged write events that occurred between the retrieved patch and the identified database state. These log files keep the history of the write events that introduced a modification of the data pages. In step S230, the identified database is recovered by applying the list of logged write events to the retrieved patch.

Back to FIG. 1, next at step S40 a new branch is created by creating a new patch as alternative state of the identified state and with a reference to the identified state. If the identified state does not already exist on the disk as a result of flushing the buffer and is a state chronologically between two stored patches, the creation of the new patch further comprises flushing the buffer to the database storage. By having the respective state of the new branch flushed to the database the method can use the log files to reconstruct the respective reconstruction of the intermediate states corresponding to this branch.

A reference to the identified state is added to each newly created patch of the new branch such that the database is able to find that the alternative state is referring to which branch. Finding this corresponding branch is important in order to find query the database states on the new branch. The reference to the identified state comprises a reference to the retrieved patch if the identified state is represented by a patch and a reference to the patch created after the buffered pages being flushed to the database storage if the identified state is not represented by a patch.

FIG. 4 illustrates an example of creating tree of database states as alternative states according to the present method, wherein the database states store a tree of data. The information of the tree in the data structure layer is stored in some data pages in the storage layer. As shown in FIG. 4, at timestamp T1 the mapping table maps the logical addresses (1,2,3) to the physical addresses (adr #1, adr #2, adr #3) in the storage, respectively. For timestamp T2, the write event modifies the pages 1 and 3 and a corresponding new patch is created on the database storage comprising only the modified pages, i.e., page 1 and page 3. As a consequence of this modification, the mapping table is updated and maps the logical addresses (1,2,3) to the physical addresses (adr #1, adr #2, adr #2) in the database storage, respectively. Addresses in a patch are local to the patch and are not a global address. The corresponding patches of timestamp T1 and timestamp T2 are considered to be on a same branch named B1. At timestamp T4 fork is applied on the history of the database at timestamp T1 and a new branch named B2 is created from the state of the database corresponding to timestamp T1. In this new branch, the page 3 is modified compared to the identified state of timestamp T1 and a corresponding new patch is created on the database storage with the modified page 3. In some examples, the creating of the new branch may be performed at timestamp T3 and modifying page 3 at timestamp T4. In this scenario, the patch is then created only at timestamp T4 since the branch B2 created at timestamp T3 points to an already existing patch. The mapping table of the corresponding new patch is updated to map the logical addresses (1,2,3) to the physical addresses (adr #1, adr #2, adr #1). As mentioned above, addresses in a patch are local to the patch and are not a global address. A reference to the patch of timestamp T2 on branch may be written in the descriptor of the patch of timestamp T4 on branch B2.

In the present disclosure, an alternative state of the database on the new branch is created without any impact on the data structures by manipulating only logical identifiers of pages. This strategy is implemented at the storage level of the database and not at the data structure level, which makes the branching capability of this method applicable to all data structures of the database. This is available without a cost in software development and maintenance as queries and algorithms running on these data structures are executed independently from the branch they are on.

In addition, there is no duplication of data nor pages between the two branches which reduces the cost for the required resources. In this method, opening a transaction on a given branch boils down to creating the corresponding mapping table, in the same way that we would create it on a single branch. The difference is that one needs to know when to fork and jump to another storage item which is provided by using the reference to the identified state. The references may be included in the descriptor of a patch. The cost in term of CPU and memory is thus similar between only one and with more than one branch. The overhead and storage cost are limited to the storage cost of the pages modified in the new branch.

Embodiments have been described. It will be understood that various modifications may be made without departing from the spirit and scope of the embodiments. Therefore, other implementations are within the scope of the following claims.

The invention claimed is:
1. A computer implemented method for creating a tree of database states, comprising:
    accessing a database having at least one branch of database states;
    receiving, at the database, one or more write events that are applied to an identified state of the database;
    recovering the identified state of the database from the database; and
    creating a new branch by creating a new patch as an alternative state to the identified state of the database with a reference to the identified state of the database, wherein recovering the identified state of the database further comprises:
retrieving, in a sequence of database states from a database storage, a patch on a branch of the identified state of the database;
retrieving a list of logged write events that occurred between the retrieved patch and the identified state of the database; and
applying the list of logged write events to the retrieved patch.

2. The computer implemented method of claim 1, wherein the creating of the new branch by creating the new patch further comprises flushing a buffer to the database storage when the identified state of the database is not a patch stored in the database storage.

3. The computer implemented method of claim 2, wherein the reference to the identified state of the database includes:
a reference to the retrieved patch when the identified state of the database is represented by a patch; and
a reference to a patch created after flushing of the buffer to the database storage when the identified state of the database is not represented by a patch.

4. The computer implemented method of claim 2, wherein the new patch includes a list of new pages that are modified or created by one or more new write events, therefore obtaining a sequence of states wherein some states respectively have a corresponding patch.

5. The computer implemented method of claim 4, wherein the new patch further includes:
a mapping table comprising a mapping between physical addresses of the flushed buffer and logical addresses of respective pages at a data structure layer of the database.

6. The computer implemented method of claim 5, wherein each logged write event of the retrieved list has a mapping table by duplicating an existing mapping table and applying local mappings up to a desired logged write event.

7. The computer implemented method of claim 2, wherein the new patch further comprises:
a descriptor including at least one of:
a number of physical pages modified or created by the one or more new write events;
metadata for checking integrity of the descriptor;
a timestamp of the one or more new write events; and
a reference to corresponding identified state of the database.

8. The computer implemented method of claim 1, wherein the database storage is append-only.

9. The computer implemented method of claim 1, further comprising, before retrieving a list of logged write events:
logging each of the one or more write events on a log storage received by the database and writing a history of modifications as a log of events to the log storage for intermediate transactions which are transactions before flushing to the database storage.

10. The computer implemented method of claim 9, wherein the log storage is append-only.

11. A non-transitory computer readable storage medium having recorded thereon a computer program having instructions that when executed by a computer cause the computer to perform a method for creating a tree of database states, the method comprising:
accessing a database having at least one branch of database states;
receiving, at the database, one or more write events that are applied to an identified state of the database;
recovering the identified state of the database from the database; and
creating a new branch by creating a new patch as an alternative state to the identified state of the database with a reference to the identified state of the database, wherein recovering the identified state of the database further comprises:
retrieving, in a sequence of database states from a database storage, a patch on a branch of the identified state of the database;
retrieving a list of logged write events that occurred between the retrieved patch and the identified state of the database; and
applying the list of logged write events to the retrieved patch.

12. The non-transitory computer readable storage medium of claim 11, wherein the creating of the new branch by creating the new patch further comprises flushing a buffer to the database storage when the identified state of the database of the respective alternative state is not a patch stored in the database storage.

13. The non-transitory computer readable storage medium of claim 12, wherein the reference to the identified state of the database further includes:
a reference to the retrieved patch when the identified state of the database is represented by a patch; and
a reference to the patch created after flushing of the buffer to the database storage when the identified state of the database is not represented by a patch.

14. The non-transitory computer readable storage medium of claim 13, wherein the new patch comprises a list of new pages that are modified or created by one or more new write events, therefore obtaining a sequence of states wherein some states have respectively a corresponding patch.

15. The non-transitory computer readable storage medium of claim 14, wherein the new patch further includes:
a mapping table comprising a mapping between physical addresses of the flushed buffer and logical addresses of respective pages at a data structure layer of the database.

16. The non-transitory computer readable storage medium of claim 15, wherein each logged write event of the retrieved list has a mapping table by duplicating an existing mapping table and applying local mappings up to a desired logged write event.

17. The non-transitory computer readable storage medium of claim 12, wherein the new patch further comprises a descriptor comprising at least one of:
a number of physical pages modified or created by the one or more new write events;
metadata for checking integrity of the descriptor;
a timestamp of the one or more new write events; and
a reference to corresponding identified state of the database.

18. A database comprising:
a non-transitory computer readable storage medium having recorded thereon a computer program comprising instructions that when executed by a computer causes the computer to perform a method for creating a tree of database states, the method comprising:
accessing a database having at least one branch of database states;
receiving, at the database, one or more write events that are applied to an identified state of the database;
recovering the identified state of the database from the database; and creating a new branch by creating a new patch as an alternative state to the identified state of the database with a reference to the identified state of the database,
wherein recovering the identified state of the database further comprises:
retrieving, in a sequence of database states from a database storage, a patch on a branch of the identified state of the database;
retrieving a list of logged write events that occurred between the retrieved patch and the identified state of the database; and
applying the list of logged write events to the retrieved patch.

* * * * *